United States Patent
Appelqvist (10) Patent No.: US 7,140,475 B1
(45) Date of Patent: Nov. 28, 2006

(54) BRAKE

(75) Inventor: Roger L. E. Appelqvist, Harryda (SE)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 0 days.

(21) Appl. No.: 10/848,926

(22) Filed: May 19, 2004

(51) Int. Cl.
*A01H 5/02* (2006.01)
*F16D 59/00* (2006.01)

(52) U.S. Cl. .................................. 188/186; 310/77

(58) Field of Classification Search ............ 188/186, 188/184, 181 A, 181 C, 134
See application file for complete search history.

(56) References Cited

U.S. PATENT DOCUMENTS

| | | | | |
|---|---|---|---|---|
| 300,647 A | * | 6/1884 | Sharp | 188/186 |
| 818,830 A | * | 4/1906 | Kirby | 188/186 |
| 865,732 A | * | 9/1907 | Vandervell et al. | 188/186 |
| 3,135,137 A | * | 6/1964 | Cunningham | 408/124 |
| 3,760,570 A | * | 9/1973 | Ehrlich et al. | 56/10.8 |
| 4,355,540 A | * | 10/1982 | Chombard et al. | 74/5.1 |
| 4,647,801 A | * | 3/1987 | Swartwout | 310/41 |
| 5,033,278 A | * | 7/1991 | Hossfield et al. | 68/23.7 |
| 5,740,892 A | * | 4/1998 | Huang | 192/43.1 |
| 5,915,484 A | * | 6/1999 | Hsieh | 173/176 |
| 5,988,328 A | * | 11/1999 | Newport | 188/186 |
| 6,688,438 B1 | * | 2/2004 | Bucher | 188/185 |
| 6,845,831 B1 | * | 1/2005 | Smith et al. | 180/53.1 |

FOREIGN PATENT DOCUMENTS

JP          55097533 A    *    7/1980

* cited by examiner

*Primary Examiner*—Robert A. Siconolfi
(74) *Attorney, Agent, or Firm*—Sylke Law Offices, LLC; C. Thomas Sylke (57) ABSTRACT

A motor brake can be coupled to the rotatable motor drive shaft. The brake includes a shaft-mountable support that rotates uniformly with the drive shaft. One or more brake shoes, which can include flyweights or the like, are hingedly mounted to the support and include brake pads. A centripetal force is applied to the brake shoes using one or more springs or other biasing means that bias the brake pads against a braking surface when rotation of the shaft is below a minimum rotational velocity. The brake pads disengage from the braking surface when shaft rotation exceeds the minimum rotational velocity. The centrifugal force induced and applied to the brake shoes and brake pads by rotation of the motor drive shaft overcomes the biasing force to disengage the brake pads from the braking surface, which may be the housing of a motor to which the brake is affixed.

17 Claims, 6 Drawing Sheets

BRAKE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

The present invention relates generally to motors employing rotating elements such as drive shafts. More specifically, the present invention relates to a braking system that can be used on a motor drive shaft and/or the like that is intended to remain stationary when the motor is not energized.

2. Description of Related Art

Many motors and other mechanisms employ drive shafts and the like as rotating elements or components. When a motor is energized (that is, turned on), the drive shaft rotates, transferring power to another component, such as a pulley, gear or gearbox. When the motor is turned off, the drive shaft should remain motionless. In many cases, for example with lifting equipment, a drive shaft may be loaded when the motor is turned off and, as a result of the loading, have a tendency to rotate and thus allow the load to move. Maintaining the drive shaft in a stationary position in such situations may be desirable and even critical.

Where maintaining a drive shaft in a static position is important for safety, proper operation of the equipment, etc., unintended rotation of a drive shaft or the like can have unfavorable implications for equipment and people. Manual locks and brakes (that is, locks and brakes that require an operator to manually engage the lock or brake) can be effective in holding a shaft stationary, but the operator must remember to engage and disengage the lock/brake. This is not always done properly.

Systems and techniques that permit reliable automatic locking and/or braking of a drive shaft and/or other rotating element would represent a significant advancement in the art.

BRIEF SUMMARY OF THE INVENTION

Rotation of a drive shaft or similar component during motor operation disengages one or more brake pads from frictional engagement with a stationary part of the motor or other stationary braking surface. When the motor is de-energized, slowing shaft rotation automatically brings one or more brake pads back into frictional engagement with the braking surface. Control of the brake pads' positioning is based on balancing the centrifugal force created by shaft rotation with a biasing centripetal force. Typically, only a supplemental braking force must be applied to the motor drive shaft due to a significant amount of internal friction against unwanted drive shaft rotation when the motor is not energized.

In some embodiments of the present invention, a motor has a rotatable drive shaft and a brake coupled to the shaft. The brake includes a shaft-mounted support that rotates uniformly with the drive shaft. One or more brake shoes (which can include flyweights or the like) are hingedly mounted to the support and include brake pads. The centripetal force is applied to the brake shoes using one or more springs that bias the brake pads against a braking surface when rotation of the shaft is below a minimum rotational velocity. The brake pads disengage from the braking surface when shaft rotation exceeds the minimum rotational velocity.

The brake pads may be made of any material providing a sufficient coefficient of friction with whatever braking surface is used. In some embodiments, the braking surface is a portion of the motor's housing.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited illustrative and exemplary embodiments.

The present invention uses the rotation of a motor shaft or similar component during operation to disengage one or more brake pads from frictional engagement with a stationary part of the motor or other stationary braking surface or member. Likewise, the slowing rotation of the shaft after power to the motor is turned off automatically brings one or more brake pads into frictional engagement with the braking surface. This control of the brake pads is based on balancing the centrifugal force created by rotation of the motor's rotating member (for example, a drive shaft) with a biasing centripetal force. The brake of the present invention typically only needs to apply a supplemental braking force to the drive shaft of a motor because the motor usually provides a significant amount of internal friction against unwanted drive shaft rotation when the motor is not energized.

Figure 1:
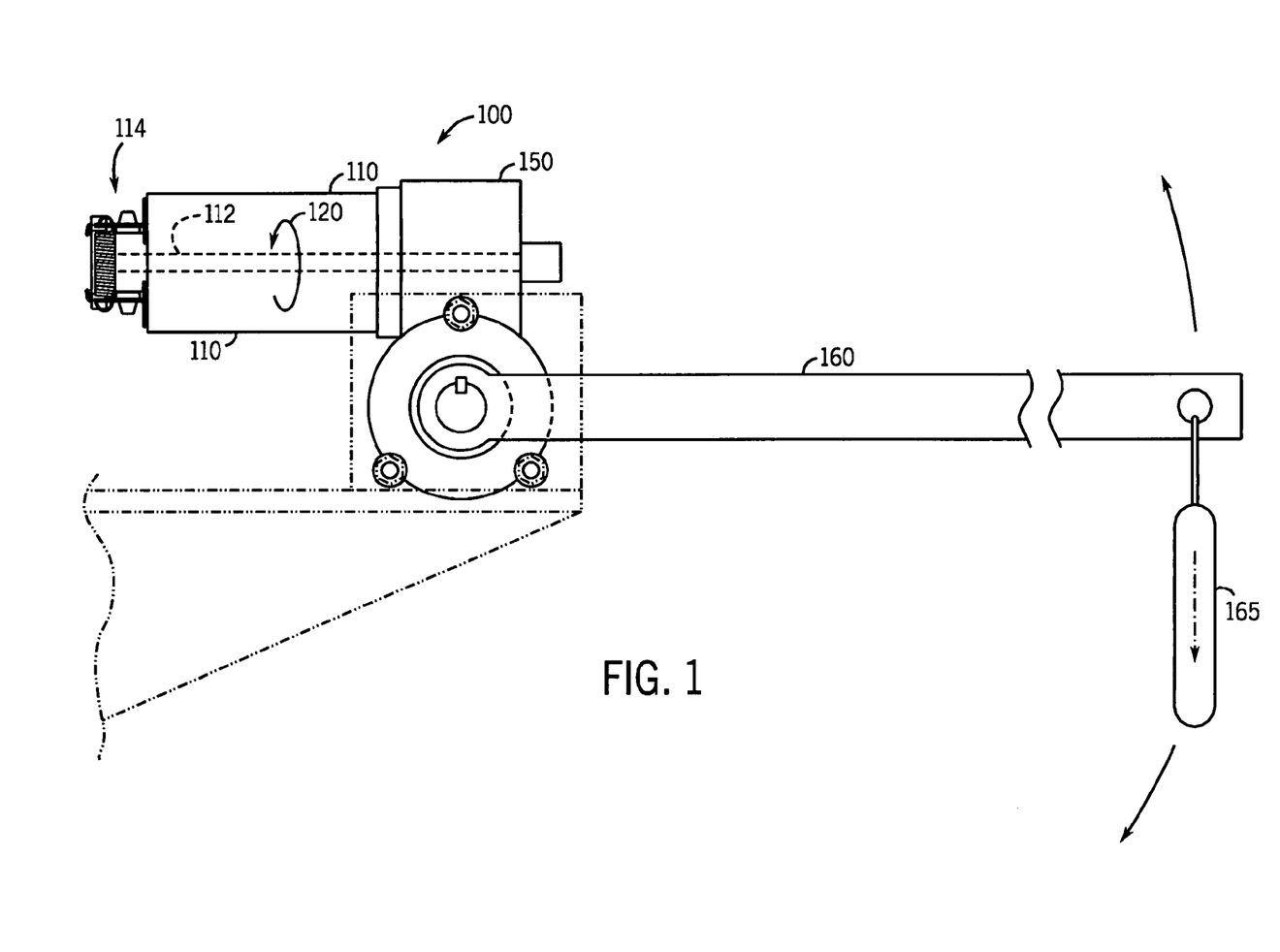
FIG. 1 is a side plan view of a lifting apparatus incorporating a motor and brake according to one embodiment of the present invention.

A generic motor configuration employing one embodiment of the present invention is shown in FIGS. 1–5. In FIG. 1, a motor 100 has a housing 110, a drive shaft 112 that rotates relative to the housing 110 when the motor is energized, and a brake 114 according to one embodiment of the present invention affixed to the drive shaft 112. The internal configuration and operation of the motor 100 and drive shaft 112 are well known to those skilled in the art and will not be described in detail. Shaft 112 extends longitudinally through the motor housing 110 and can rotate as indicated by arrow 120.

In FIG. 1, motor 100 is operatively coupled to gearbox 150, which again is of standard design and operation and will not be explained in detail. To illustrate one example of a load on drive shaft 112, a lever arm 160 bearing a load 165 is attached to gearbox 150. This is a generic load and could be any force that is applied to drive shaft 112 directly or indirectly in any direction/orientation that rotationally loads shaft 112. When the motor 100 is energized (that is, turned on), the shaft 112 rotates to raise or lower the load 165. When the motor 100 is de-energized (that is, turned off), rotation of the drive shaft slows and eventually stops, after which the shaft ideally should not rotate at all, thus preventing any movement of the lever arm 160 and load 165. In many situations, maintaining the load 165 in a static position may be important for various reasons (for example, to protect the load from falling and damaging or being damaged by the surface above which it is suspended and/or to protect individuals who may be nearby from being injured from unexpected movement of the load). Many motors provide via internal friction a substantial amount of the friction needed to maintain the drive shaft in a static position. However, in some circumstances (for example, where a heavier load is being held in place and rotationally loading the drive shaft), this internal friction may be insufficient.

Figure 2:
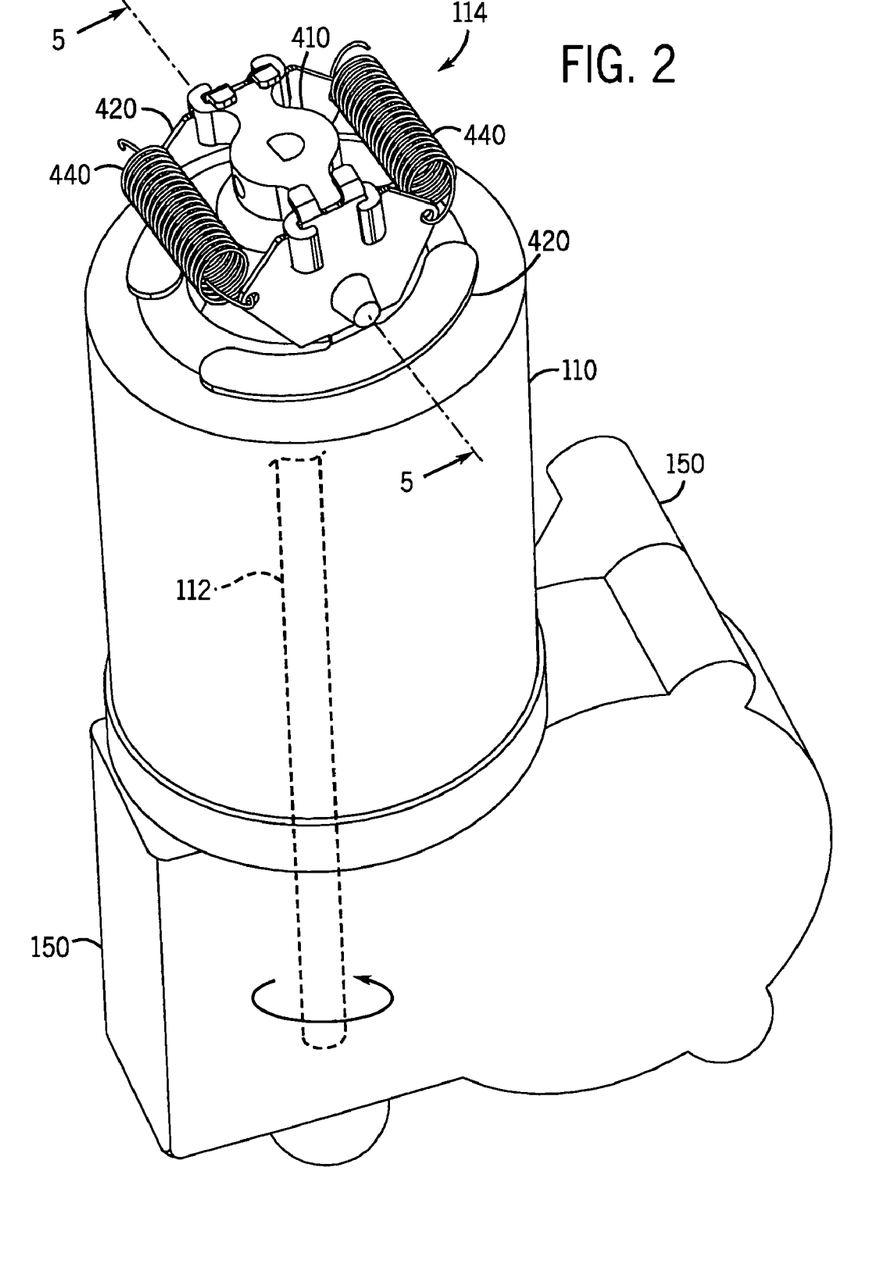
FIG. 2 is a perspective view of the motor and brake of FIG. 1.
Figure 3:
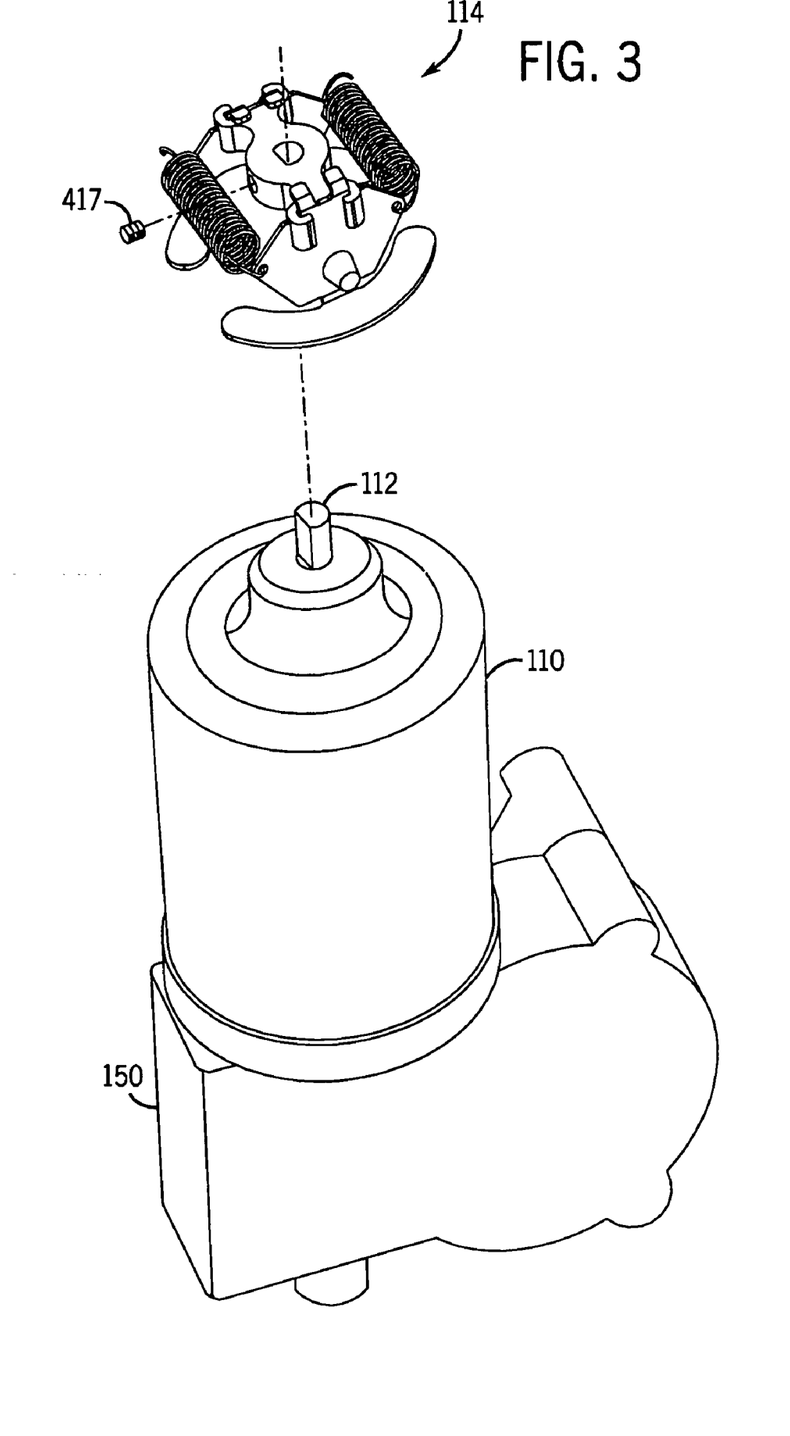
FIG. 3 is an exploded view of the motor and brake of FIG. 2 showing the mounting of the brake to the drive shaft of the motor.

A more detailed illustration of a brake according to one embodiment of the present invention is shown in FIG. 2. Motor housing 110 is mounted to gearbox 150 and one end of shaft 112 extends therethrough. Brake 114 is coupled to the opposite end of shaft 112, as will be explained in more detail below. FIG. 3 shows the mounting of brake 114 to drive shaft 112 in more detail. The brake is affixed to one end of the shaft 112 so that the brake 114 and shaft 112 rotate (and stop) in unison. In the embodiment shown in FIG. 3, the end of shaft 112 to which brake 114 is affixed has been modified to a D-shape. The D-shaped shaft end mates with the D-shaped mounting hole of the brake 114.

Figure 4:
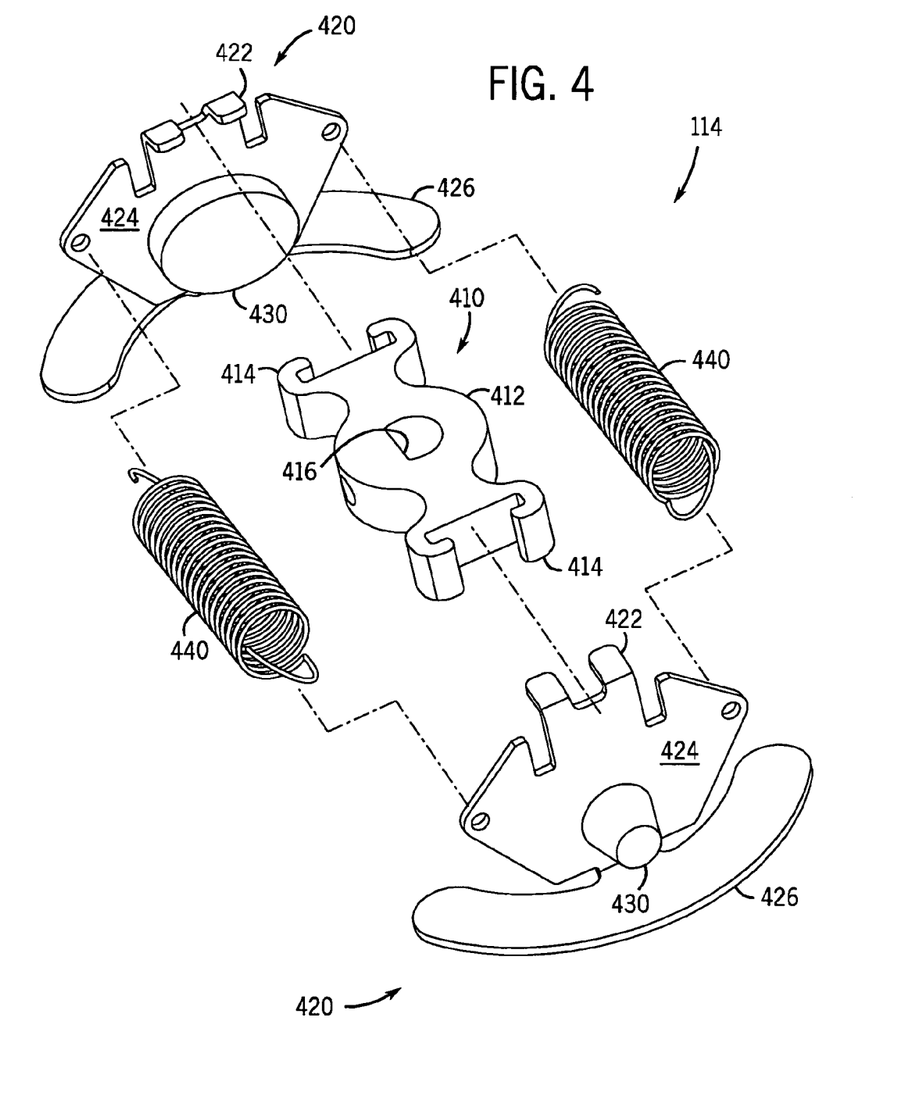
FIG. 4 is an exploded view of a centrifugal brake according to one embodiment of the present invention.

As seen in FIG. 4, brake 114 includes a central support 410 having a drive shaft mounting hub 412 and opposing C brackets 414. Each C bracket 414 defines a confining space that will be explained in more detail below. Support 410 is affixed to the drive shaft 112 by any suitable mounting means. In the embodiment of the present invention shown in FIG. 4, hub 412 has a center D-shaped hole 416. A matching D shaped post at the end of drive shaft 112 fits snugly in hole 416 and may be further secured by a setscrew 417 or the like, thus preventing any relative motion between the drive shaft 112 and support 410, and providing for adjustment and setting of the axial brake clearance.

In other embodiments, the end of the motor shaft 112 can be bored and tapped, flush with the end of a bell housing surface 111 of motor housing 110. A setscrew can be inserted into the end of the shaft 112, protruding to provide in effect a shaft extension and a hex recess to manually operate the motor (for example, in case of power failure). The brake hub bore 416 is threaded and screwed onto the threaded shaft extension. The axial brake clearance is adjusted by rotating the hub 410 on the threaded shaft extension until the brake clearance gap is set and then tightening a radial setscrew against the shaft extension. This construction can be useful for particular applications, though it may be more complicated than the illustrative example of the Figures. Other suitable mounting means might include one or more setscrews through hub 412, shaft keys, splines, a double-D shaft, press fitting, welding, soldering, gluing and clamping, locking pins and/or other apparatus known and apparent to those skilled in the art. The mounting means ensures that the brake 114 and drive shaft 112 move and stop together uniformly without any appreciable slippage, so that any torque applied to the drive shaft 112 is appropriately transferred to the brake 114, and vice versa.

Two brake shoes 420 having brake pads 430 are hingedly mounted to the hub 412 using the C brackets 414. "Hingedly mounted" means that each shoe 420 is able to rotate outwardly from support 410 to a limited degree, even though a traditional hinge, per se, may or may not be used as the mounting structure. As will be appreciated by those skilled in the art, more than two brake shoes may be employed in connection with embodiments of the present invention. Moreover, it is possible to construct a brake in accordance with the present invention having only one brake shoe. Centrifugal balancing may be more challenging and/or complicated where an asymmetric shoe configuration is used, but resolving such issues will be apparent to those skilled in the art after reading the present disclosure.

In the exemplary apparatus of the FIG. 4, each brake shoe 420 is made up of a brake shoe bracket 424 having one or more hinge tabs 422. In the embodiments of the present invention shown in the Figures, shoe bracket 424 is a flat metal plate that is bent into the configuration shown. One or more bent, tongue shaped extensions of bracket 424 can be used as hinge tabs 422 and a flyweight 426 is bent outwardly at approximately a right angle. Tabs 422 engage the C brackets 414 of central support 410. The specific shapes and configurations of these components can be varied without departing from the scope of the present invention. Moreover, the components of brake 114 can be made from various materials and their fabrication performed in different ways, as will be appreciated by those skilled in the art. For example, the brake shoes could be molded as one complete unit having the springs, brake shoe bracket and flyweights integrated. Other molded components also might be used in connection with the present invention, as will be appreciated by those skilled in the art.

According to one embodiment of the present invention, each hinge tab 422 is inserted through the confining space defined by the prongs of C bracket 414 and then bent as shown to prevent the brake shoe 420 from disengaging from the bracket 414. As seen in the cross-sectional view of FIGS. 5–8, the thickness of the metal plate used for shoe bracket 424 is slightly less than the confining space defined by C bracket 414. This permits the shoe 420 to pivot outward slightly, thus allowing limited arcuate discplacement of flyweight 426 in certain circumstances. One such circumstance is rotation of the brake 114 at or above a minimum velocity. Rotation of the drive shaft 112 (and thus brake 114) provides sufficient centrifugal force to overcome the centripetal force applied to the brake shoes 420 by extension springs 440. The maximum arcuate displacement of the flyweights 426 can be adjusted and controlled by adjusting the confinement space defined by the prongs of the C bracket 414 and/or the width of the plate used for shoe bracket 424. Other hinge mountings and configurations that permit limited pivoting of each brake shoe 420 based on rotational speed of the drive shaft 112 will be known or apparent to those skilled in the art after reading the present disclosure.

A brake pad 430 is attached to the brake shoe bracket 424 in any suitable fashion. In the embodiments of the present invention shown in FIGS. 1–6, each brake pad 430 is affixed to the center section of bracket 424 between the flyweight 426 and hinge tabs 422. This configuration allows each pad 430 to engage the bell housing 111 of motor housing 110 in a generally perpendicular orientation (applying virtually all of the centripetal biasing force of springs 440 in a normal orientation), as indicated by arrows 510 in FIG. 5. As noted above, rotation of the drive shaft 112 likewise rotates brake 114. When drive shaft 112 has a reached a minimum rotational velocity, or has applied sufficient torque to overcome the frictional force holding pads 430 in place on bell housing 111, the pads 430 disengage as a result of the centrifugal force generally indicated by arrows 610 in FIG. 6. Because the internal friction applied to motor drive shaft 112 is typically much greater than the frictional force applied by the pads 430, the force needed to overcome the frictional holding of the brake pads 430 is usually minimal.

Figure 5:
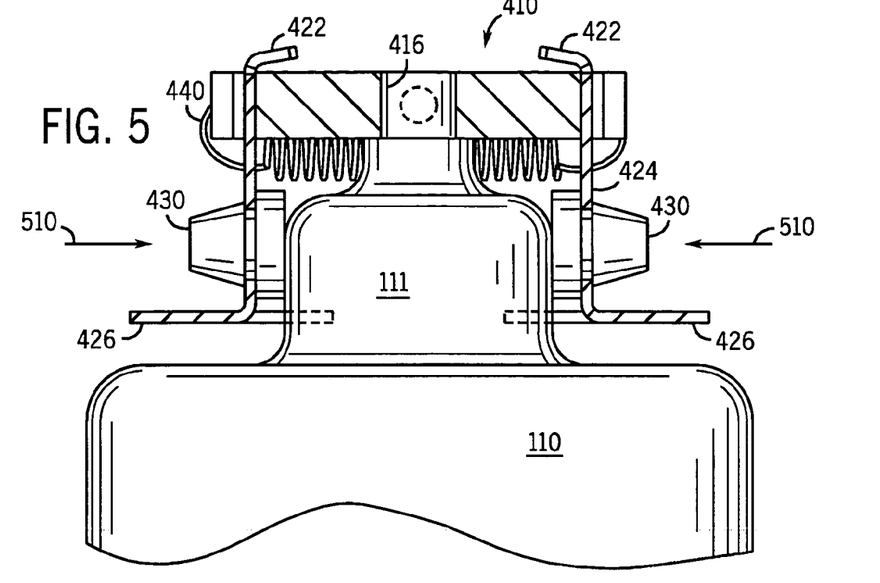
FIG. 5 is a side cross-sectional view of the motor and brake of FIG. 2, taken along the line 5—5 of FIG. 2, showing the orientation of the brake when the drive shaft is stationary and/or rotating below a minimum rotational velocity needed to disengage the brake pads.
Figure 6:
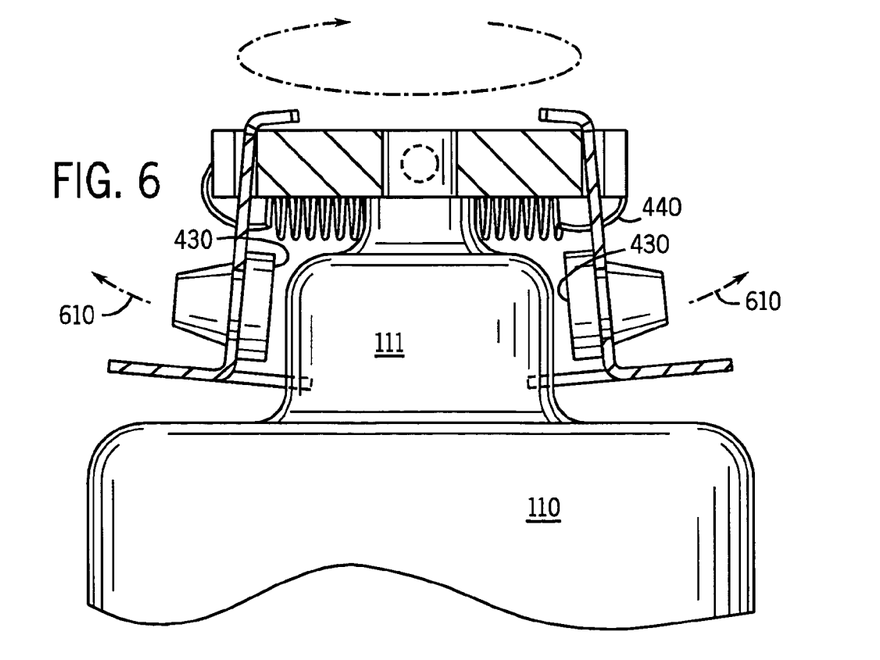
FIG. 6 is a side cross-sectional view of the motor and brake of FIG. 2, taken along the line 5—5 of FIG. 2, showing the orientation of the brake when the drive shaft is rotating at or above the minimum rotational velocity needed to disengage the brake pads.

As long as drive shaft 112 maintains or exceeds the minimum rotational velocity, pads 430 will remain out of contact with bell housing 111 and drive shaft 112 can rotate freely. The minimum rotational velocity required to allow free rotation of the drive shaft 112 is determined by various factors known to those skilled in the art, including the mass of the brake pads 430 and brake shoes 420 and any centripetal force applied to the brake shoes 420. As will be appreciated by those skilled in the art, adjustments can be made easily to achieve the desired performance characteristics in embodiments of the present invention.

Each brake pad 430 can be a resilient, high friction material that is inserted through a mounting hole in the shoe 420. Friction materials can include asbestos compositions, non-asbestos compositions, metallic materials, carbon composite, molded or machined plastics, cork, and even wood. Material for pad 430 is selected so that an appropriate coefficient of friction (kinetic and/or static) exists between the pad 430 and whatever material is used as the engaging surface, depending on the normal force applied to the pads 430 and the braking surface (for example, bell housing 111 or housing 110). Again, suitable materials can be chosen by those skilled in the art. In the embodiments of the present invention illustrated herein, nylon is used as the brake pad material.

As noted above, the two brake shoes 420 are biased toward one another by a biasing means that applies a normal force between each brake pad 430 and the braking surface. In the embodiment of the present invention shown in FIGS. 1–6, pads 430 frictionally engage bell housing 111, which is an axial, generally cylindrical extension of the housing 110 of motor 100. In this embodiment, the biasing means is a pair of extension springs 440. Springs 440 are hooked to corners of the brake shoe brackets 424 and are situated on either side of central support 410. Other biasing means can be used, as will be appreciated by those skilled in the art. For example, elastic bands or molded polymeric arms that have an integrated spring function could be substituted for the springs 440. Other suitable biasing means are known to those skilled in the art.

Moreover, the biasing means can be configured in different ways to apply a sufficient centripetal force to the brake pads 430, thus providing a normal frictional force between the pads 430 and whatever braking surface is used. For example, where more than two brake shoes are used, consecutive brake shoes may be connected by springs or other biasing members to apply inward, centripetal force components to the brake pads. However, as will be appreciated by those skilled in the art, generally directly opposing springs such as the springs 440 in FIG. 4 minimize the shear force provided, a force that is unusable for biasing the brake pads.

The brake torque typically is selected to be much less than the motor stall torque (to ensure that the motor starts easily). Usually, embodiments of the present invention need only supplement the internal friction of the motor, gears, etc., especially in a self-locking, right angle drive configuration, to prevent unintended motor shaft rotation (for example, back driving). In such a case, and typical with overhung loads with a right angle gearmotor, it is nominally self-locking against back driving based upon the lead angle of the worm (8° to 10°) and coefficient of friction of the gears.

Frictional engagement between the pads 430 and bell housing 111 of motor 100 is shown in FIG. 5. The biasing centripetal force of the springs 440 indicated generally by arrows 510 forces the pads 430 to engage housing 111 with sufficient friction to prevent sliding or slippage of the pads 430 along housing 111, even when the drive shaft 112 is loaded. Generally, a force of approximately 8.6 N (1.94 lbf) has been found to be sufficient when polyvinyl chloride is used as the brake pad material and a load of 386 lbs (175 kg) is loaded on equipment using embodiments of the present invention.

When the motor 100 is energized, the torque applied by drive shaft 112 is sufficient to overcome the typically limited frictional force between the brake pads 430 and the bell housing 111. Once the drive shaft 112 has achieved a minimum rotational velocity, the centrifugal force of the flyweights 426 and other brake shoe components keeps the brake pads 430 away from the bell housing 110, as seen in FIG. 6. As long as the drive shaft 112 maintains that minimum velocity, the rotation of the drive shaft 112 induces a centrifugal force sufficient to overcome the centripetal loading of springs 440. As can be seen in FIG. 6, rotation of the drive shaft 112 at or above the minimum velocity causes arcuate displacement of the flyweights 426, as indicated by arrows 610. It is the radial component of the displacement of the brake pads 430 from housing 111 that disengages the pads 430 from frictional holding in this embodiment. Generally, the brake 114 can be designed so that the maximum speed of the drive shaft 112 causes the minimum displacement of the brake pads 430 needed for normal operation of the motor 100.

When the motor 100 is subsequently de-energized, the drive shaft velocity drops, reducing the applied centrifugal force. When the velocity of the drive shaft 112 falls below the minimum velocity, the biasing force of the springs 440 again prevails and brings brake pads 430 back into frictional engagement with housing 111.

Figure 7:
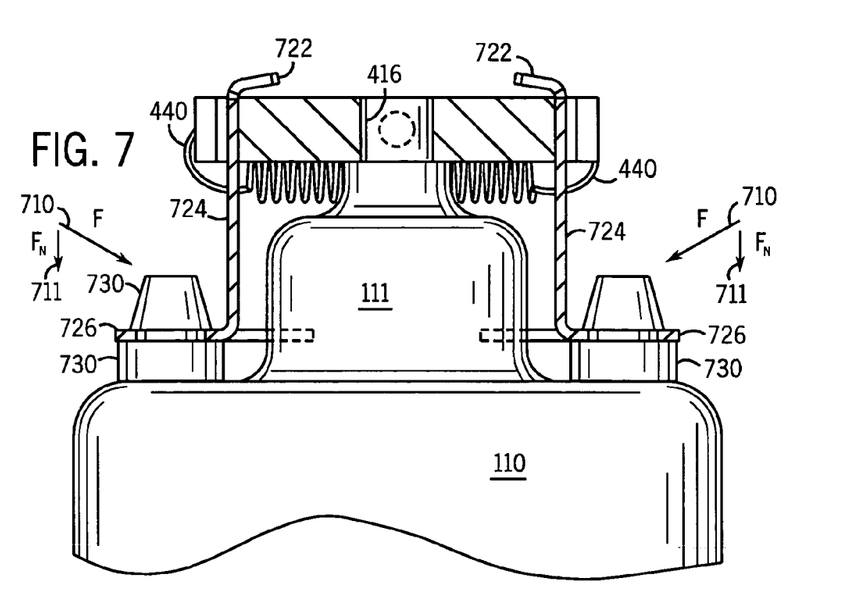
FIG. 7 is a side cross-sectional view of a motor and brake according to an alternative embodiment of the present invention, showing the orientation of the brake when the drive shaft is stationary and/or rotating below a minimum rotational velocity needed to disengage the brake pads.
Figure 8:
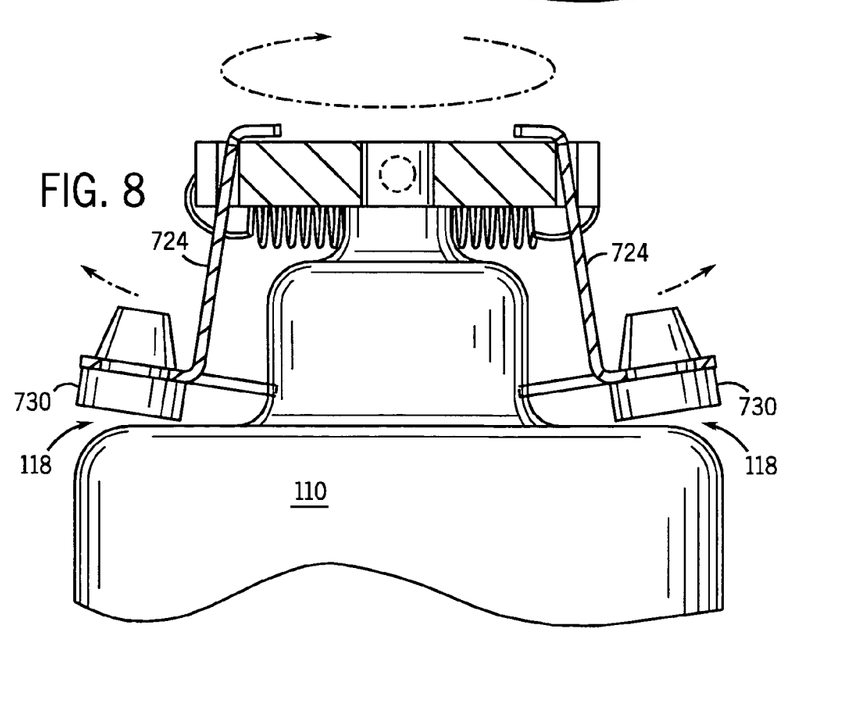
FIG. 8 is a side cross-sectional view of a motor and brake according to an alternative embodiment of the present invention, showing the orientation of the brake when the drive shaft is rotating at or above the minimum rotational velocity needed to disengage the brake pads.

In another embodiment of the present invention shown in FIGS. 7 and 8, brake shoes 720 include hinge tabs 722, bracket 724 and flyweights 726. Here, the brake pads 730 are affixed to the flyweights 726 of brake shoes 720. Thus, instead of engaging the bell housing 111 of the motor housing 110, pads 730 engage the generally flat, end surface 118 of housing 110 of motor 100. As seen in FIG. 7, it is the axial force component $F_N$ (indicated by arrows 711) of the biasing force F (indicated by arrows 710) of the springs 440 that provides the frictional normal force on surface 118. In this embodiment, it is the axial component of the displacement of the brake pads 730 from housing surface 118 that disengages the pads 730 from frictional holding.

As will be appreciated by those skilled in the art, various braking surfaces can be used, depending on the environment in which the brake is used and the orientation of the brake pads relative to the available braking surface(s). For example, the braking surface can include a cylindrical surface concentric and coaxial with the motor shaft or a flat surface perpendicular to the motor shaft, or a surface of any angle in between, as will be appreciated by those skilled in the art.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A motor having a housing having an outer surface, a drive shaft rotatable relative to the housing outer surface about a drive shaft rotational axis, and a brake coupled to the shaft, the brake comprising:
   a support affixed to one end of the motor drive shaft, wherein the support rotates generally uniformly about the drive shaft rotational axis when the drive shaft is rotated;
   a first brake shoe mounted to the support using a hinge having a hinge rotational axis perpendicular to the drive shaft rotational axis, the first brake shoe comprising a first brake shoe brake pad; and
   a first spring biasing the first brake pad into frictional engagement against the housing outer surface when rotation of the drive shaft is below a minimum rotational velocity;
   wherein the first brake shoe brake pad disengages from the housing outer surface when rotation of the drive shaft exceeds the minimum rotational velocity.

2. The motor of claim 1 wherein the first brake shoe further comprises:
   a first brake shoe bracket having a flyweight and a hinge tab; and
   wherein the first brake shoe brake pad is mounted between the flyweight and the hinge tab.

3. The motor of claim 1 wherein the first brake shoe further comprises:
   a first brake shoe bracket having a flyweight and a hinge tab; and
   wherein the first brake shoe brake pad is mounted to the flyweight.

4. The motor of claim 1 wherein the brake further comprises a second brake shoe mounted to the support, the second brake shoe comprising a second brake shoe brake pad;
   wherein the first and second brake shoes are on opposite sides of the support;
   further wherein the first spring connects the first brake shoe to the second brake shoe and biases the first and second brake pads into frictional engagement against the housing outer surface when rotation of the drive shaft is below the minimum rotational velocity.

5. The motor of claim 4 wherein the support comprises a hub and a pair of C brackets on opposite sides of the hub and further wherein a hinge tab of each brake shoe engages one of the C brackets to secure the brake shoe to the hub while permitting limited arcuate displacement of a flyweight on each brake shoe.

6. The motor of claim 4 wherein the brake further comprises a second spring connecting the first and second brake shoes and biasing the first and second brake pads into frictional engagement against the housing outer surface when rotation of the drive shaft is below the minimum rotational velocity.

7. The motor of claim 1 further comprising means for mounting the brake to the motor drive shaft.

8. A motor brake comprising:
   a support comprising a mounting hub having a hub rotational axis about which the hub rotates;
   a first brake shoe mounted to the support using a first brake shoe hinge having a first brake shoe hinge rotational axis perpendicular to the hub rotational axis, the first brake shoe comprising a first brake shoe frictional brake pad;
   a second brake shoe mounted to the support using a second brake shoe hinge having a second brake shoe hinge rotational axis perpendicular to the hub rotational axis, the second brake shoe comprising a second brake shoe frictional brake pad;
   a first spring connecting the first and second brake shoes, the first spring biasing the first brake shoe brake pad toward the second brake shoe brake pad when rotation of the drive shaft is below a minimum rotational velocity; and
   a second spring connecting the first and second brake shoes, the second spring biasing the first brake shoe brake pad toward the second brake shoe brake pad when rotation of the drive shaft is below a minimum rotational velocity;
   wherein the biasing of the first brake shoe brake pad toward the second brake shoe brake pad is overcome by centrifugal force when rotation of the drive shaft exceeds the minimum rotational velocity.

9. The brake of claim 8 wherein the first brake shoe comprises:
   a hinge tab for mounting the first brake shoe to the support, and
   a flyweight;
   wherein the first brake shoe brake pad is mounted between the hinge tab and the flyweight; and
   further wherein the second brake shoe comprises:
   a hinge tab for mounting the second brake shoe to the support, and
   a flyweight;
   wherein the second brake shoe brake pad is mounted between the hinge tab and the flyweight.

10. The brake of claim 8 wherein the first brake shoe comprises:
  a hinge tab for mounting the first brake shoe to the support, and
  a flyweight;
  wherein the first brake shoe brake pad is mounted to the flyweight; and
further wherein the second brake shoe comprises:
  a hinge tab for mounting the second brake shoe to the support, and
  a flyweight;
  wherein the second brake shoe brake pad is mounted to the flyweight.

11. A motor brake comprising:
  a support having motor drive shaft mounting means having a drive shaft rotational axis;
  a first brake shoe mounted to the support using a first brake shoe hinge having a first brake shoe hinge rotational axis perpendicular to the drive shaft rotational axis, the first brake shoe comprising a first brake shoe frictional brake pad;
  a second brake shoe mounted to the support using a second brake shoe hinge having a second brake shoe hinge rotational axis perpendicular to the drive shaft rotational axis, the second brake shoe comprising a second brake shoe frictional brake pad; and
  means for biasing the first brake shoe brake pad toward the second brake shoe brake pad when rotation of the drive shaft is below a minimum rotational velocity;
  wherein the biasing of the first brake shoe brake pad toward the second brake shoe brake pad is overcome by centrifugal force when rotation of the drive shaft exceeds the minimum rotational velocity.

12. The brake of claim 11 wherein the biasing means comprises a spring connecting the first and second brake shoes, the spring biasing the first brake shoe brake pad toward the second brake shoe brake pad when rotation of the drive shaft is below a minimum rotational velocity.

13. The brake of claim 11 wherein the first brake shoe comprises:
  a hinge tab for mounting the first brake shoe to the support, and
  a flyweight;
  wherein the first brake shoe brake pad is mounted between the hinge tab and the flyweight; and
further wherein the second brake shoe comprises:
  a hinge tab for mounting the second brake shoe to the support, and
  a flyweight;
  wherein the second brake shoe brake pad is mounted between the hinge tab and the flyweight.

14. The brake of claim 13 wherein the first brake shoe is mounted to a first C bracket on the support;
  further wherein the second brake shoe is mounted to a second C bracket on the support; and
  further wherein the first C bracket is on the opposite side of the support from the second C bracket.

15. The brake of claim 11 wherein the mounting means comprises at least one of the following:
  a setscrew,
  a shaft key,
  a spline,
  a double-D shaft mounting hole,
  a D-shaped shaft mounting hole,
  press fitting,
  welding,
  soldering,
  gluing and clamping, or
  a locking pin.

16. The brake of claim 11 wherein the first brake shoe comprises:
  a hinge tab for mounting the first brake shoe to the support, and
  a flyweight;
  wherein the first brake shoe brake pad is mounted to the flyweight; and
further wherein the second brake shoe comprises:
  a hinge tab for mounting the second brake shoe to the support, and
  a flyweight;
  wherein the second brake shoe brake pad is mounted to the flyweight.

17. The brake of claim 16 wherein the first brake shoe is mounted to a first C bracket on the support;
  further wherein the second brake shoe is mounted to a second C bracket on the support; and
  further wherein the first C bracket is on the opposite side of the support from the second C bracket.

* * * * *